Feb. 23, 1932.  E. ALIBERT  1,847,032
CLUTCH APPARATUS
Filed Sept. 6, 1928  2 Sheets-Sheet 2
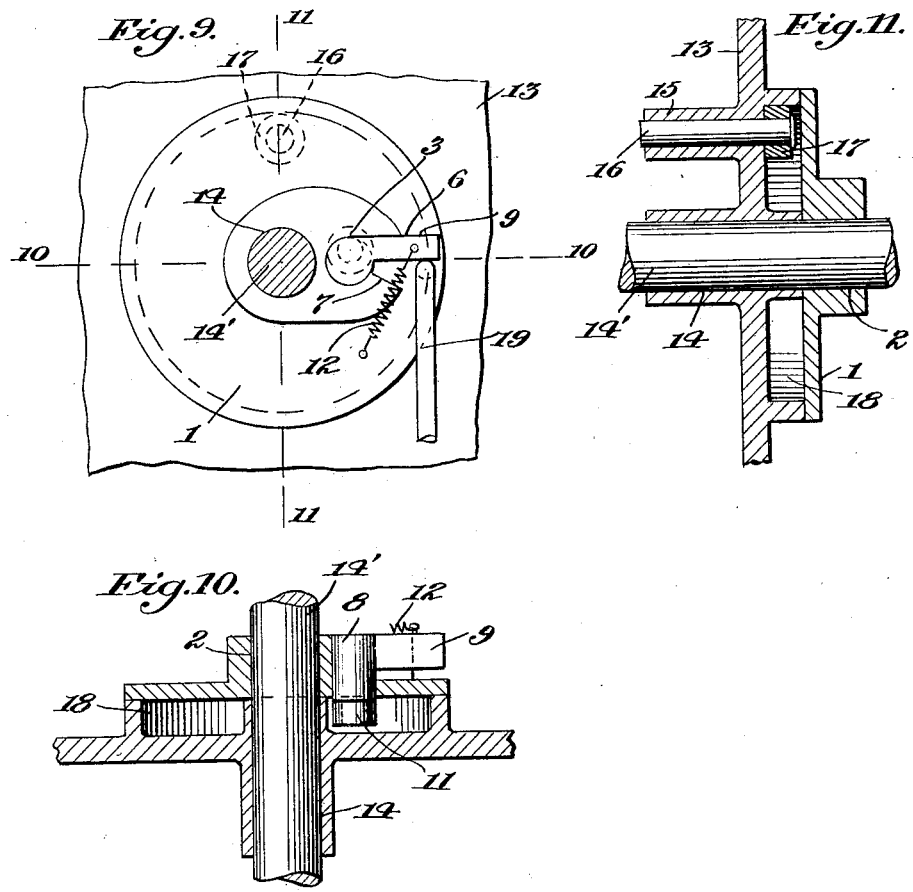
Inventor:
Emile Alibert,
by E. F. Wenderoth
Att'y.

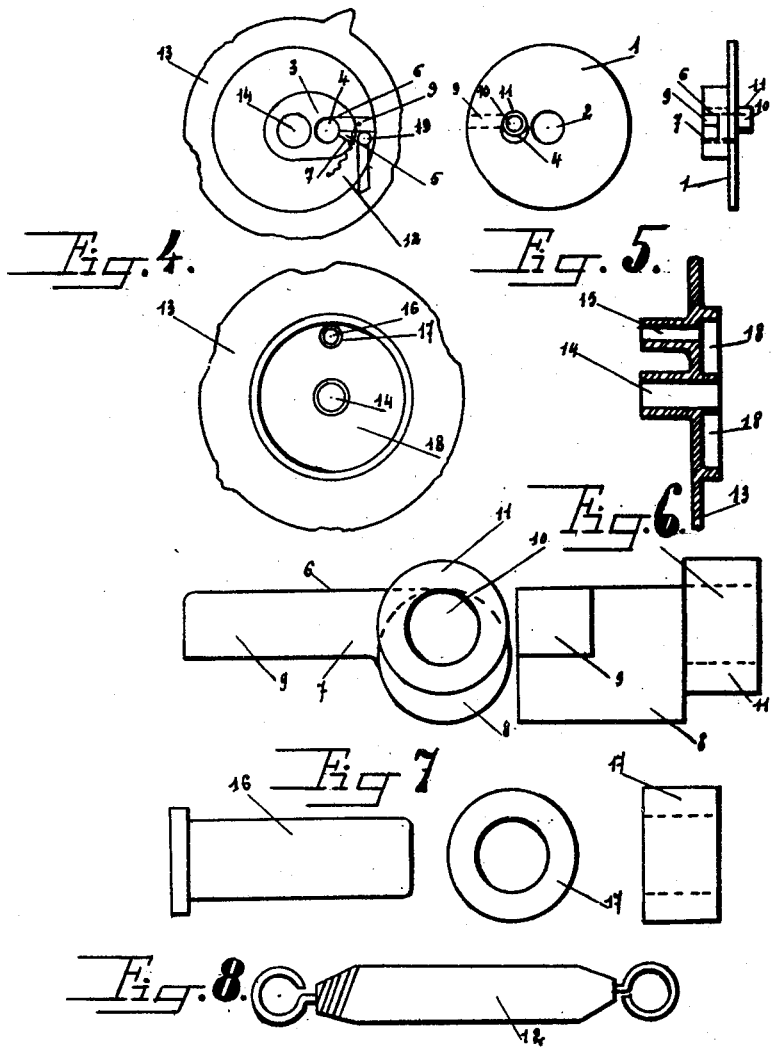

Patented Feb. 23, 1932

1,847,032

UNITED STATES PATENT OFFICE

EMILE ALIBERT, OF PARIS, FRANCE, ASSIGNOR TO COMPAGNIE DE MACHINES AUTOMATIQUES SAVINGMA, OF PARIS, FRANCE

CLUTCH APPARATUS

Application filed September 6, 1928, Serial No. 304,256, and in France September 13, 1927.

The present invention relates to improvements in clutch apparatus.

The said improvements are characterized by the means employed, the disposition of the parts, and the control of the said parts.

The appended drawings represent the various parts of the apparatus according to the invention.

Fig. 1 is a general front view of the clutch.

Fig. 2 is an interior view of the actuating disc secured to the shaft of the machine under control.

Fig. 3 is a side view of the said disc.

Fig. 4 is an interior view of the pulley actuating the disc shown in Figs. 1 and 2.

Fig. 5 is an axial section of this pulley.

Fig. 6 shows the eccentric lever for clutching and release, and also its roller.

Fig. 7 shows the axle carrying the roller (secured in the pulley) as well as the said roller.

Fig. 8 shows the reaction spring for the said lever.

Fig. 9 is a view on a somewhat larger scale of substantially the same elements shown in Fig. 1.

Fig. 10 is a sectional view taken on the line 10—10 of Fig. 9.

Fig. 11 is a sectional view taken on the line 11—11 of Fig. 9.

Referring to the different figures, it will be observed that the clutch apparatus is constructed as follows.

The disc 1 is bored by machine to form the aperture 2 by which the said disc may be mounted upon the shaft of the machine to be actuated. At a determined distance from the aperture 2 is formed a second aperture 3 in which is pivotally mounted the cylindrical body of the eccentric lever 4. Upon the outer face of the disc 1 is provided the recess 5, whose upper face 6 is parallel with the axis of the two apertures and is in line with the upper part of the aperture 3. The lower face 7 is trimmed to a determined angle whose vertex is the axis of the aperture 3.

The eccentric lever 4 is pivoted, by its cylindrical body 8, in the said orifice 3. The portion 9 forming an arm or lever is movable in the aperture 5. The eccentric cylindrical portion 10 carries a tempered steel roller 11; the said portion 10 extends inwardly of the face of the disc 1 and is disposed in the recess 18 of the pulley 13. The axis of this eccentric part is at 90° from the lower part of the lever 9 which is situated on the axis of the cylindrical body 8.

The reaction spring 12 urges the lever 9 into contact with the face 7 of the aperture 5. The pulley 13 has a suitable form appropriate to the machine to be actuated, and it has at the centre a bored aperture 14 by which it is rotatable upon the shaft 14' of the said machine. At a suitable distance from the aperture 14 is an aperture 15 coacting with an axle 16 upon which is mounted a tempered steel roller 17 which is disposed in the cylindrical recess 18 and is flush with its outer edge. The abutment ring (not shown) holds the pulley against all sliding upon the shaft.

The operation is as follows.

When the disc 1 is secured to the shaft and the pulley is in position, the rollers 11 and 17 will be situated in the recess 18. Since the said disc is stationary, and the upper face of the lever 9 is in contact with the face 6 of the aperture 5 (the distance between the axes of the supports of the rollers 11 and 17 being suitably determined) the pulley will rotate; but if the lever 9 is lowered in such manner that its lower face makes contact with the lower face 7 of the aperture 5, the eccentric cylindrical part 10 of the lever will move about its roller 11. The roller 17 which rotates upon its supporting axle 16, secured to the pulley, will resume contact with the roller 11, and will draw with it the disc 1 until the lower end of the lever 9 makes contact with the stop 19 controlled by a pedal, or by any suitable part of the apparatus. Due to this contact, the lever 9 will be brought to the rear. Its upper part makes contact with the face 6 of the aperture 5 and thus brings the cylindrical part 10 to its initial position, thereby releasing the rollers 11 and 17 and releasing the said pulley which will loosely rotate until the said stop releases the lever 9; the spring 12 will then bring the said lever into contact with the face 7 of the aperture 5 whereby the said rollers will be placed in contact.

In the said apparatus, the clutching action takes place by means of rollers, but the said rollers may be eliminated, and I may employ stationary abutments for this purpose. The point of contact is situated at a certain distance from the centre, so that an effective drive will be assured.

Since the eccentric cylindrical part is at 90° from the lower face of the lever 9 when in the stopped position the rollers will make contact at a point between this angle, so that the eccentric part 10 holding the roller 11 will not return to the rear, while at the same time permitting the rapid release when the lever 9 is lowered into its stopping position.

I claim:

1. As an element of a clutch apparatus, a disc, said disc having a central opening, said disc also having an offset aperture, the disc being recessed from the periphery to the offset aperture in such manner that the top edge of the recess is substantially parallel to the line of centers of the two openings, and is tangent to the offset opening, while the lower edge flares downwardly and outwardly, and is so arranged that if prolonged it would pass through substantially the center of the offset aperture.

2. A new clutch apparatus comprising a clutch pulley, an annular groove therein, a shaft on which said pulley is mounted, and which said clutch is adapted to control, a disc mounted on said shaft and forming part of the said clutch, an eccentric lever having a roller thereon and mounted in said disc, the said disc having an aperture with flared openings thereon for receiving the said eccentric lever and for permitting slight rotational movement thereof, the said roller being arranged in the said annular groove, and a second roller mounted on the pulley and also arranged in said groove, the said rollers normally contacting during operation of the clutch, and means operable at will for causing the eccentric lever to disengage the pulley from the shaft whereby the pulley will rotate loosely on the shaft.

In testimony whereof I affix my signature.

EMILE ALIBERT.